March 27, 1956 L. M. TERANDO 2,739,776
ADJUSTABLE AND EXPANDING PALLET
Filed Aug. 14, 1953 2 Sheets-Sheet 1
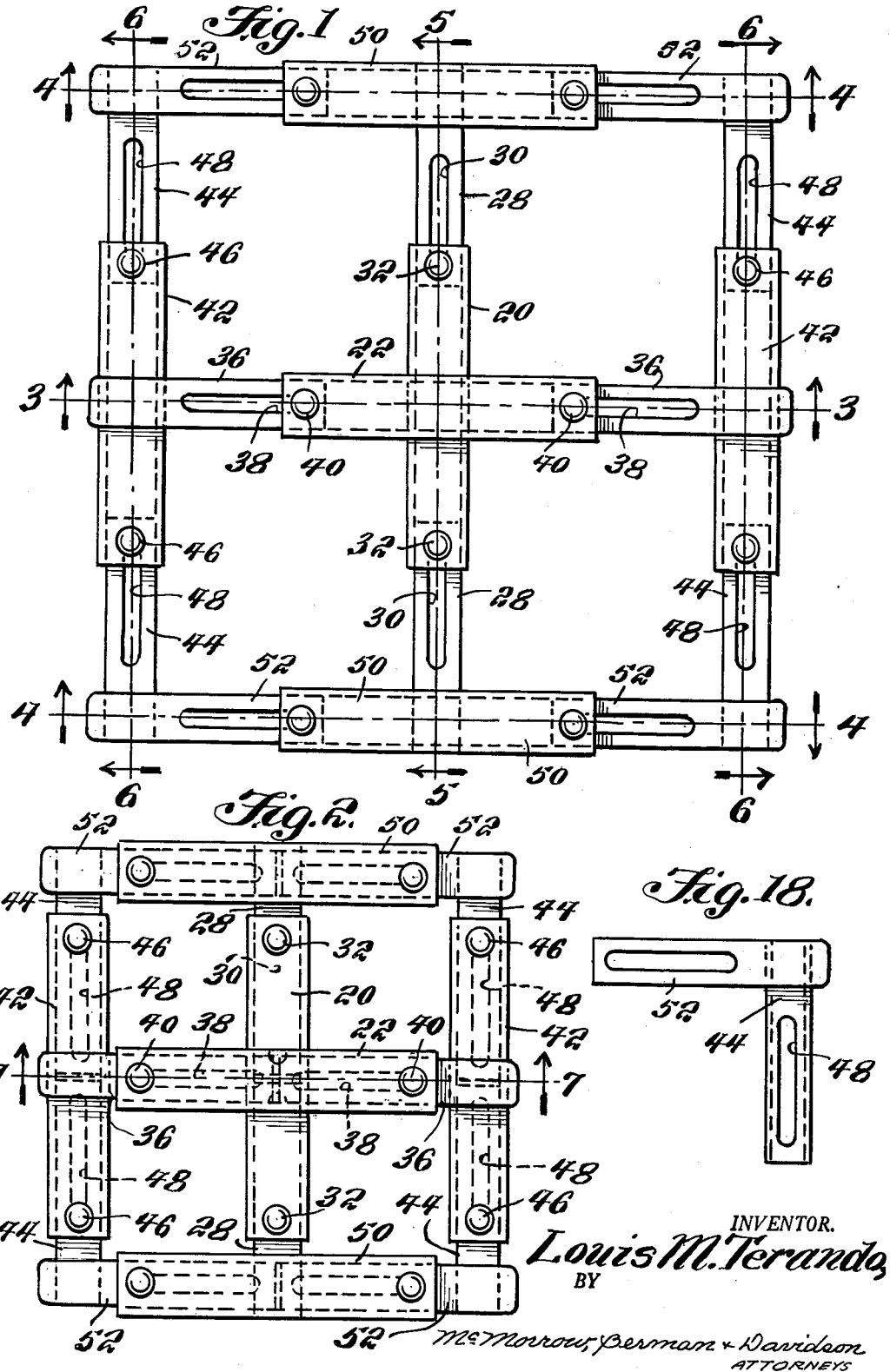

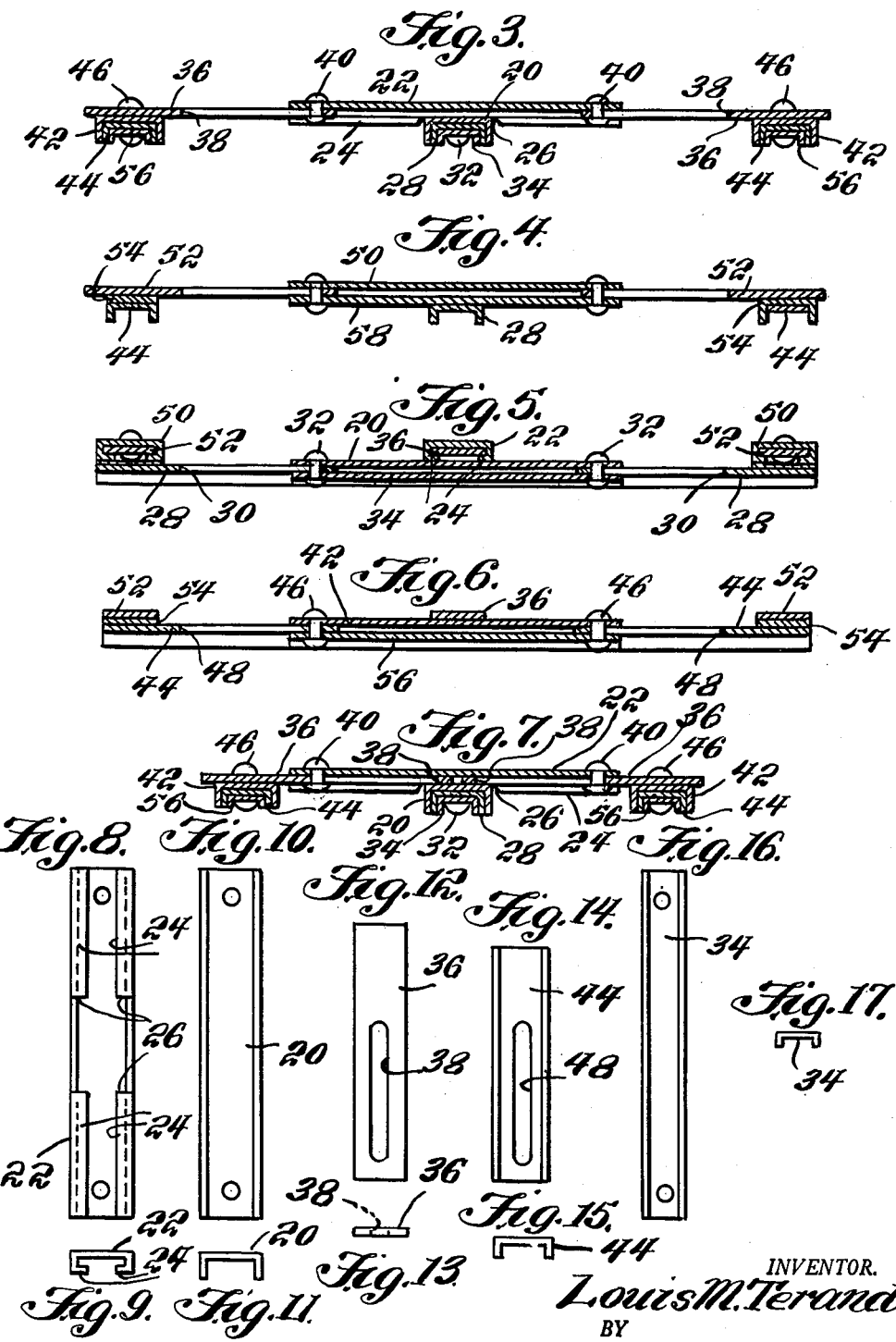

United States Patent Office 2,739,776
Patented Mar. 27, 1956

2,739,776

ADJUSTABLE AND EXPANDING PALLET

Louis M. Terando, Marseilles, Ill.

Application August 14, 1953, Serial No. 374,233

3 Claims. (Cl. 248—120)

This invention relates to skid pallets, such as those used in warehousing operations for the stacking of various materials and objects.

Under present practices, most factories, warehouses, and other installations having a material storage problem require from three to as many as twenty pallets of different sizes. Obviously, to reduce the amount of storage space required for storage of particular material to a minimum, a pallet should be no greater, or little greater, than the cross sectional area of the material supported thereupon. Since stored materials and objects vary widely from one another in respect to the cross sectional size thereof, correspondingly varying pallets must be stocked. It should be noted that in referring to the cross sectional area of the supported materials, I am herein making reference to the cross sectional area of a supported stack of objects, that is, the amount of floor area taken up by the supported mass.

The stocking of a large number of pallets of different sizes presents a problem in itself, since it involves the reservation of an excessive amount of storage space for pallets not in use. The majority of the pallets, of course, will not be in use at a particular time, thus causing the unused devices to take up space which could otherwise be devoted to the storage of other materials.

The main object of the present invention is to provide an adjustable and expanding skid pallet which can be readily adjusted to any of various sizes, within a wide range, thus to permit the same pallet to be used for supporting stacks widely varying from one another as to the floor area taken up thereby. In this way, it is proposed to provide what may be appropriately termed a universal pallet, which will eliminate the need for stocking pallets of different sizes. Through the use of a universal pallet, it is possible to manufacture pallets in no more than a few basic sizes, with each size pallet being adjustable itself to various sizes within a particular range. Pallets so designed will allow a factory or warehousing installation to stock a comparatively few pallets, since all the pallets will be used with notable regularity. In this way, a resultant saving in storage space is accomplished, thus representing dollar savings with said savings deriving not only from the practice of stocking fewer pallets than are heretofore required, but also from the practice of increasing the storage area of the pallet-supported materials.

A further object of the present invention is to provide an adjustable and expanding skid pallet which will be adjustable not only with respect to the floor area to be taken up thereby, but also with respect to the shape of the pallet, the construction which I have devised being such as to permit elongation of one side of the pallet relative to the other side, thereby allowing the pallet to be adjusted not only to a square shape in each position to which it is expanded, but also to other rectangular shapes in each of said positions.

Another object is to provide a pallet as stated which, though being composed of relatively movable parts, will nevertheless be possessed of a strength comparing favorably to that of a conventional, rigidly constituted pallet.

Yet another object is to provide an adjustable skid pallet as described which, though composed of relatively telescoping parts, will nevertheless have coplanar floor-contacting surfaces as well as coplanar load-supporting surfaces, thus to provide a pallet which will be possessed of a high degree of stabilty when not in use.

A further object of importance is to provide a pallet which will be adjustable in the manner referred to above, thus to produce the several desirable results noted, but which will at the same time be capable of storage in a minimum amount of space, not only as regards the floor area taken up by the stored pallets, but also as regards the thickness of each pallet.

Other objects will appear from the following description, the claims appended thereto, and from the annexed drawing, in which like reference characters designate like parts throughout the several views, and wherein:

Figure 1 is a top plan view of a pallet formed in accordance with the present invention, as it appears when expanded to take up a greater amount of floor area;

Figure 2 is a view similar to Figure 1 in which the pallet has been reduced in size;

Figure 3 is a sectional view on line 3—3 of Figure 1;

Figure 4 is a sectional view on either line 4—4 of Figure 1;

Figure 5 is a sectional view on line 5—5 of Figure 1;

Figure 6 is a sectional view on either line 6—6 of Figure 1;

Figure 7 is a sectional view on line 7—7 of Figure 2;

Figure 8 is a bottom plan view of one of the main pieces of the center frame;

Figure 9 is an end elevational view of the piece shown in Figure 8;

Figure 10 is a bottom plan view of the other main piece of the center frame;

Figure 11 is an end elevational view of the main piece shown in Figure 10;

Figure 12 is a plan view of one of the extension pieces of the center frame;

Figure 13 is an end elevational view of said extension piece;

Figure 14 is a bottom plan view of one of the extension pieces of one of the pallet sides;

Figure 15 is an end elevational view of the extension piece of Figure 14;

Figure 16 is a bottom plan view of a reinforcing bar incorporated in the center frame;

Figure 17 is an end elevational view of said reinforcing bar; and

Figure 18 is a plan view showing one of the pallet corners.

The pallet constituting the present invention can be appropriately considered as including a cruciform center frame and a rectangular outer frame within which the center frame is confined. The center frame, in turn, comprises independently extensible center frame assemblies, two of which are provided with said assemblies being crossed in perpendicular relation to one another. The outer frame comprises rectangularly arranged outer frame assemblies, each of said outer frame assemblies being extensible and defining one side of the pallet.

Considering first the construction of the cruciform center frame, this, as noted above, comprises perpendicularly related center frame assemblies. One of said assemblies includes a main piece 20 shown per se in Figures 10 and 11. The main piece 20 is also shown to advantage in Figures 1 and 2, and comprises an elongated channel member of inverted U shape in cross section.

Overlying the mid-length portion of the main piece 20 is the main piece 22 of the other center frame assembly. This, as shown in Figures 8 and 9, is also a channel member, of inverted U shape in cross section. However, the depending side walls of the main piece 22 are flanged inwardly as at 24, as distinguished from the main piece 20, which is not so flanged.

The mid-length portion of the main piece 22 is welded or otherwise permanently and fixedly attached to the mid-length portion of the main piece 20, and as will be noted from Figures 3 and 8, the inwardly extended flanges 24 are cut away as at 26, where the main piece 22 crosses over the main piece 20.

Connected to the ends of the main piece 20 are extension pieces 28 each of which has a longitudinal, closed slot 30 through which extends a rivet or connecting pin 32 carried by the associated end of the main piece 20. Each extension piece 28 has the cross sectional shape of an inverted U, and is, in effect, nested within the center or main piece 20 when retracted to its maximum extent, in the manner shown in Figure 2.

To reinforce the main piece 20, I provide a reinforcing bar 34 (Figure 16) of inverted U shape in cross section, that nests within the extension pieces 28, the reinforcing bar 34 being connected at its ends to the ends of the main piece 20 through the medium of the rivets 32. The extension pieces 28 slide in the spaces between the end portions of the main piece 20 and the end portions of the reinforcing bar 34.

Thus, one center frame assembly is composed of the main piece 20, the extension pieces 28, and the reinforcing bar 34. This center frame assembly is adjustable as to length, the minimum length being shown in Figure 2 and the maximum length being shown in Figure 1. Any of various lengths falling between the minimum and the maximum lengths can be selected for the center frame assembly, of course, during use of the device. The other center frame assembly includes not only the main piece 22, but extension pieces 36 having longitudinal slots 38 through which extend rivets 40 carried by the end of the main piece 22. The extension pieces 36, as distinguished from the extension pieces 28, are not of inverted U shape in cross section, but rather, are wholly flat as shown in Figures 12 and 13.

It will be appreciated that although the main pieces of the two crossing center frame assemblies are fixedly connected to one another, each of said center frame assemblies is extendable as to length to a selected extent, independently of the other.

Considering now the construction of the adjustable, rectangular, outer frame, the two outer frame assemblies shown at the opposite sides of Figures 1 and 2 will first be described. These are identical to one another, so the description of one will suffice for the other. Each of these particular outer frame assemblies defines a side of the pallet, and includes a main member 42 of inverted U shape in cross section, and overlying the mid-length portion of said main member 42 is the outer end of the adjacent extension piece 36, the extension piece 36 being welded or otherwise fixedly secured to said main member 42. Carried by the opposite ends of the main member 42 are extension members 44, each of which is of inverted U shape in cross section (Figures 14 and 15), each of said extension members having a longitudinal slot 48 through which extends a rivet or connecting pin 46 carried by the adjacent end of the main member 42. The extension members 44 can be retracted or extended as shown in Figures 2 and 1 respectively, and it will be noted that said main member 42 and its extension members 44 cooperate to define an extensible outer frame assembly that parallels the center frame assembly defined by main piece 20 and extension pieces 28.

The remaining two sides of the outer frame are defined by outer frame assemblies shown at the top and bottom of Figures 1 and 2 respectively. These are identical to one another, so that the description of one will suffice for the other. Each includes a main member 50, having connecting pins at its ends extending through longitudinal slots provided in extension members 52. The extension members 52, at their outer ends, overlie the outer ends of the extension members 44, and are welded or otherwise fixedly secured to said member 44. The extension members 52, in cross section, are wholly flat (Figure 6), and interposed between the outer end portions of the members 52 and the outer end portions of the members 44 are spacer plates 54, also shown to advantage in Figure 6.

It is to be noted that for the purpose of reinforcing the main members 42 in the direction of their lengths, said main members are provided with reinforcing bars identical to the reinforcing bar 34, the reinforcing bars of the outer frame assemblies being designated by the reference numeral 56. Further, as best shown in Figure 4, the main members 50 of the top and bottom outer frame assemblies shown in Figure 1 have inturned flanges 58 analogous to the flanges 24. Therefore, it can appropriately be considered that in my pallet all parallel frame assemblies are substantially identical to one another in respect to the formation and relative arrangement of their parts.

For example, the center frame assembly including the main piece 20 is substantially identical to the outer frame side assemblies including main members 42. Further, the various parts having analogy to one another in these particular assemblies are coplanar.

It follows that the center frame assembly including main piece 22 is like the outer frame side assemblies including main members 50, with the various parts of the outer frame assemblies being coplanar with and being formed like the analogous parts of the center frame assembly including main piece 22. The spacers 54, of course, dispose the extension members 52 in a plane common to the planes of the extension pieces 36.

In use of the pallet, one is permitted to adjust the overall size thereof as desired, to accommodate the particular obects that are to be supported upon the same. Thus, for example, the pallet can be adjusted to a minimum size shown in Figure 2. It would be adjusted to this size when being stored, so as to occupy a minimum of floor space when not in use. Further, some objects would be of such a size as to be capable of being stacked upon pallets that are adjusted to their minimum or Figure 2 size.

Assuming that the square outer configuration of the pallet is to be retained, but with the overall area of the pallet being increased, one need only extend the center frame assemblies for substantially identical distances, as shown in Figure 1. This would result in a corresponding extension of the various sides of the pallet.

If it is desired to elongate the pallet somewhat in a selected direction, one of the center frame assemblies, and the sides parallel thereto, would be extended appreciably, while the center frame assembly and the sides parallel thereto would be allowed to remain in their unextended positions or would, alternatively, be extended to a length less than that of the first center frame assembly. This would cause the pallet to assume a shape that is rectangular, though not perfectly square.

In every instance, the bottom or floor-engaging surfaces of the pallet will be coplanar as will be readily noted from the various sectional views shown in Figures 3–7. This is of importance for the purpose of assuring stability of the pallet, the pallet being firmly supported on the floor surface not only at its center, but along its several sides and at its corners. Further, the top or material-engaging surface of the pallet will have portions that are in a common plane, and are spaced sufficiently closely to assure that the stack will be carried by the pallet in a stable manner.

Of course, the center frame assemblies not only facilitate adjustment of the pallet to different sizes and shapes, but also provide the pallet with a center portion that will assume a substantial part of the load. A strong and serviceable pallet thus results, which pallet can be stocked in place of rigidity constituted pallets of different sizes now in use. The number of pallets which must be stocked by the installation can be measurably cut down, due to the fact that each pallet takes the place of a number of pallets now required having floor areas corresponding to the various pallet sizes that are now possible through the medium of adjustment of the illustrated device. It is thus considered to be commercially feasible to produce pallets in perhaps two or three basic sizes, a small size, a medium size, and a large size, with each of these being adjustable within a wide range.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A pallet comprising: a rectangular outer frame each of the four sides of which includes a main member and extension members telescoping independently of one another into opposite ends of the main member and aligned longitudinally with the main member, the extension members of each side being connected at their outer ends to the extension members of the two adjacent sides; and a cruciform center frame including a pair of main pieces crossing each other at right angles at their midlength locations and connected together at their point of crossing, and a pair of extension pieces telescoping independently of one another into opposite ends of, and aligned longitudinally with, each main piece, said extension pieces being disposed perpendicularly to, and being connected at their outer ends to the midlength parts of, adjacent sides of the outer frame.

2. A pallet comprising: a rectangular outer frame each of the four sides of which includes a main member and extension members telescoping independently of one another into opposite ends of the main member and aligned longitudinally with the main member, the extension members of each side being connected at their outer ends to the extension members of the two adjacent sides; and a cruciform center frame including a pair of main pieces crossing each other at right angles at their midlength locations and connected together at their point of crossing, and a pair of extension pieces telescoping independently of one another into opposite ends of, and aligned longitudinally with, each main piece, said extension pieces being disposed perpendicularly to, and being connected at their outer ends to the midlength parts of, adjacent sides of the outer frame, each main member and the extension members telescoping thereinto comprising an outer frame assembly, each main piece and the extension pieces telescoping thereinto comprising a center frame assembly, one center frame assembly being parallel with two of the outer frame assemblies and forming in association therewith a first group of frame assemblies, the other center frame assembly and the remaining two outer frame assemblies constituting a second group of frame assemblies, the frame assemblies of the first group underlying the frame assemblies of the second group to support the same in elevated position above a supporting surface contacted by the first group, the frame assemblies of the second group engaging a supported load to hold the same out of contact with the frame assemblies of the first group.

3. A pallet comprising: a rectangular outer frame each of the four sides of which includes a main member and extension members telescoping independently of one another into opposite ends of the main member and aligned longitudinally with the main member, the extension members of each side being connected at their outer ends to the extension members of the two adjacent sides; and a cruciform center frame including a pair of main pieces crossing each other at right angles at their midlength locations and connected together at their point of crossing, and a pair of extension pieces telescoping independently of one another into opposite ends of, and aligned longitudinally with, each main piece, said extension pieces being disposed perpendicularly to, and being connected at their outer ends to the midlength parts of, adjacent sides of the outer frame, each main member and the extension members telescoping thereinto comprising an outer frame assembly, each main piece and the extension pieces telescoping thereinto comprising a center frame assembly, one center frame assembly being parallel with two of the outer frame assemblies and forming in association therewith a first group of frame assemblies, the other center frame assembly and the remaining two outer frame assemblies constituting a second group of frame assemblies, the frame assemblies of the first group underlying the frame assemblies of the second group to support the same in elevated position above a supporting surface contacted by the first group, the frame assemblies of the second group engaging a supported load to hold the same out of contact with the frame assemblies of the first group, the main and extension members of each of the outer frame assemblies of the first group, and the main and extension pieces of the center frame assembly of the first group, being formed as elements of inverted U-shape in cross section with the outer, supporting-surface-engaging longitudinal edges of all of said elements lying in a common plane.

References Cited in the file of this patent

UNITED STATES PATENTS

| | | |
|---|---|---|
| 2,405,535 | Weiss | Aug. 6, 1946 |
| 2,643,081 | Spring | June 23, 1953 |
| 2,643,083 | Troutman | June 23, 1953 |